United States Patent [19]

Sauter

[11] Patent Number: 4,871,138

[45] Date of Patent: Oct. 3, 1989

[54] TELESCOPIC DEVICE WITH UNAMBIGUOUS SEQUENCE OF DEPLOYMENT AND RETRACTION

[75] Inventor: Josef Sauter, Oberteuringen, Fed. Rep. of Germany

[73] Assignee: Dornier GmbH, Friedrichshafen, Fed. Rep. of Germany

[21] Appl. No.: 167,795

[22] Filed: Mar. 14, 1988

[30] Foreign Application Priority Data

Mar. 14, 1987 [DE] Fed. Rep. of Germany ....... 3708326

[51] Int. Cl.⁴ ............................................. F16B 7/10
[52] U.S. Cl. .................................... 24 8/408; 52/118
[58] Field of Search ............... 248/677, 161, 405, 407, 248/408, 159, 157, 188.5, 333, 354.5; 292/170, 150; 52/118, 117

[56] References Cited

U.S. PATENT DOCUMENTS 2,967,006 1/1961 Sykes .................................. 248/407

FOREIGN PATENT DOCUMENTS

| | | | |
|---|---|---|---|
| 671611 | 10/1963 | Canada .............................. | 248/405 |
| 255261 | 1/1913 | Fed. Rep. of Germany ........ | 52/111 |
| 723535 | 8/1942 | Fed. Rep. of Germany ........ | 52/111 |
| 1260800 | 2/1968 | Fed. Rep. of Germany ...... | 248/405 |
| 1903652 | 9/1970 | Fed. Rep. of Germany ...... | 248/408 |
| 2326271 | 10/1974 | Fed. Rep. of Germany ........ | 52/111 |
| 2603488 | 8/1977 | Fed. Rep. of Germany ...... | 248/161 |
| 3434517 | 3/1986 | Fed. Rep. of Germany ........ | 52/118 |
| 3611810 | 8/1986 | Fed. Rep. of Germany ........ | 52/118 |
| 3522386 | 1/1987 | Fed. Rep. of Germany . | |
| 3636893 | 7/1987 | Fed. Rep. of Germany ........ | 52/118 |
| 58534 | 11/1911 | Switzerland . | |

Primary Examiner—Ramon O. Ramirez
Assistant Examiner—Robert A. Olson
Attorney, Agent, or Firm—Ralf H. Siegemund

[57] ABSTRACT

A telescopic, length extensible device, having a plurality of telescoping hollow elements, including an innermost one, at least one further, and an outermost one, further indluded a drive connected for obtaining telescopic extension and retaction is improved by a device for ensuring a predetermined sequence in the extension and retraction of the element comprising a first pin mounted for radial displacement, on one of any two mutually adjacent ones of the elements, the first pin having slot means, and being provided for selective insertion into and retraction from a third one of the elements; a couter latch element for latching insertion under spring bias and connected to another one of the two elements, such that when latching obtains, the first pin is retracted from the third element; a second spring-biased pin has a nose for lateral engagement with notches in the first pin and a control lever, operates in response to positions of the third element for locking and unlocking the second pin so that the second pin releases or locks the first pin in a protracted position of insertion in the third element or for maintaining retraction therefrom.

13 Claims, 4 Drawing Sheets

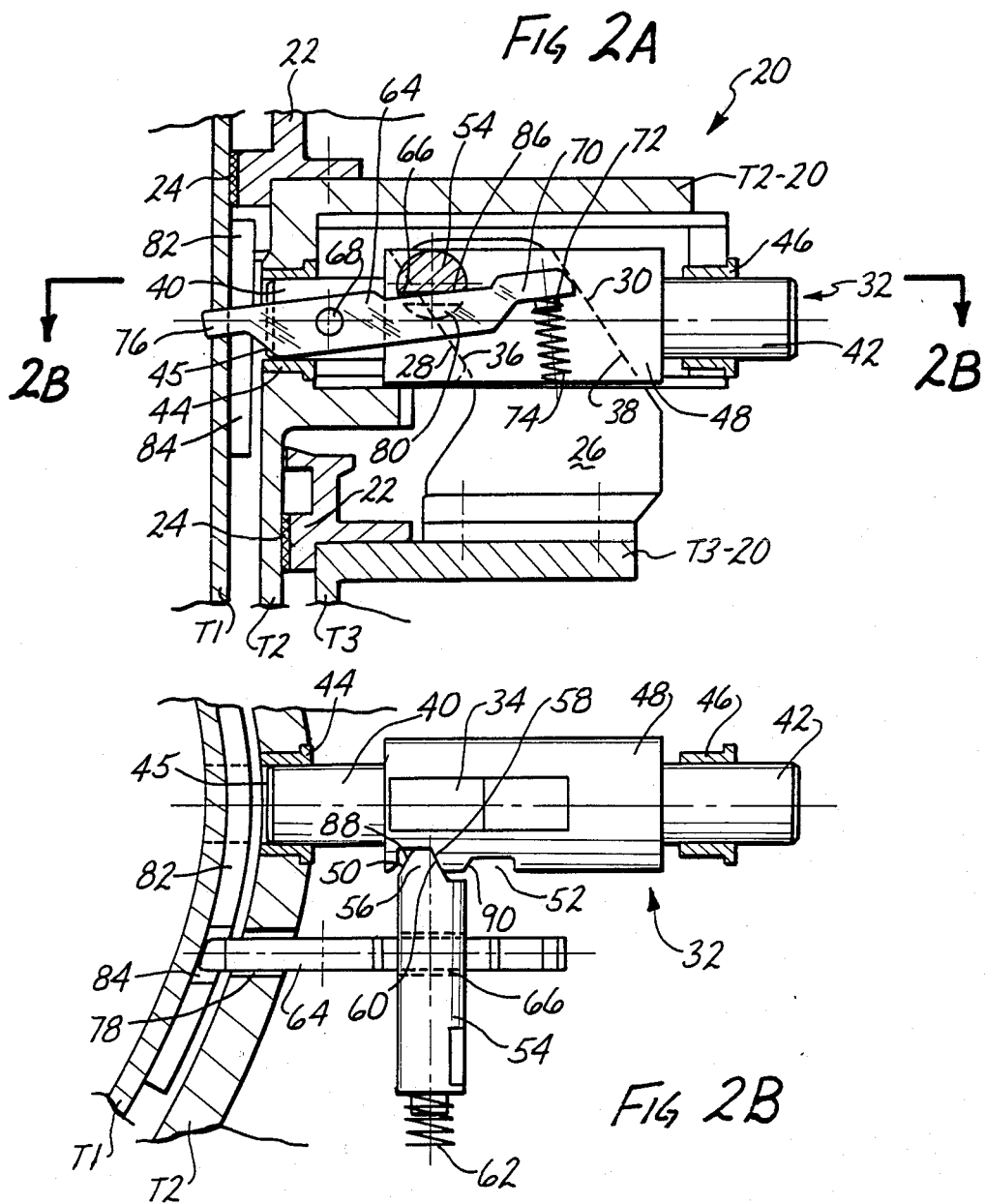

TELESCOPIC DEVICE WITH UNAMBIGUOUS SEQUENCE OF DEPLOYMENT AND RETRACTION

BACKGROUND OF THE INVENTION

The present invention relates to a telescoping length extendable device such as a tower, an antenna, carrier, carrier arms, manipulator arms or the like which include telescoped, and relatively movable elements as well as advancing/retracting driving means to obtain extension and retraction of the device.

Generally speaking, one of the simpler kinds of telescopic arrangements, are tripods known to have longitudinal, telescoping legs, and wherein the elements of a leg are protracted or pushed back manually. Force is always exerted on the innermost elements for either deployment or collapse, and these elements are coupled to the others so as to move, one by one, in one direction or the other. The relative motion of the individual telescoping elements is permitted as well as limited through stops and resilient latching structure. This kind of arrangement does not generally insure a positive sequence of operation rather the sequence and degree of movement may even vary from instance to instance. This is usually not a disadvantage for working simple tripods for photography or the like, although, inbetween positions may at times be difficult to attain. However, in some instances it is desirable to make sure that there is a definite sequence in the relative motion and extension.

The following requirement may exist. It may be assumed that a basic position obtains when all elements are completely nested and telescoped into each other. Now, the requirement is posed that the outermost one is to be moved first, then the next one, with the innermost element being the last to move. This means that the outermost latch must release more easily, i.e. must be released while latching is maintained in and for the more inner ones of the elements.

German Pat. No. 26 03 488 provides for a construction of telescopic tubes, wherein the innermost one is moved out first while the others are retained, then the next one is moved out and so forth with a positive sequence being maintained from inner to outer tubes. These known devices are provided with bridgable latches and springs, whereby the spring bias differs for the different latches—different in terms of strength that varies from the inner to the outer latches.

The Swiss Pat. No. 53 534 discloses a device with telescopic tubes of variable or different cross section and the patent described coupling and latching structure, being comprised of a spring loaded bolt or pin and a transverse lock. The latter lock runs in grooves which are provided to shift the pin into a particular bore so as to obtain a coupling relation between two tubular elements. The head part of the pin or bolt abuts the next one of the tubular elements. This abutment obtains through a spring, insertion and retraction pressure is exerted in and along the axis of the equipment. This mode of operation, however, leads to excessive friction. Considering the forces that may act on a fully deployed antenna mast galling may actually occur as well as carving or cutting-like operations.

German printed patent application No. 35 22 386 describes a telescopic device with a plurality of nestedly telescoped tubular elements, a drive is provided for retraction or protraction (or deployment), acting on the inner one of the tubular elements. There is a latching structure for blocking the individual tubular elements in relation to each other. The drive in this instance is a very time consuming one because the particular body acting on the latching device for each individual tubes has to be positioned in the uppermost position if deployment and extension is to obtain from completely retracted position in which all the coupling elements on the lowermost position. Once this particular piece hs been placed in the outermost position it has to be returned so as to obtain the operation of the next tubular element. This back and forth movement is time-consuming. The utilized elements of the latching structure, particularly the spring elements employed, are unsuitable for cooperation with larger loads unless the spring force is made so large that the pins and bolts require excessive force for abutment against the tube such that in fact deformations or cuttinglike interaction may occur.

DESCRIPTION OF THE INVENTION

It is an object of the present invention to improve known devices for telescopic deployment of towers, antenna mast or the like, using the state of the art as a point of departure but making sure that a particular sequence of element deployment or retraction obtains whereby in each particular position that is to be maintained positive locking occurs as between the particular elements involved so that even in the case of large forces that act on the telescopic device, such as wind forces or heavy loads, they can be handled without danger and without impairment of the operability of their telescopic device.

It is a specific object of the invention to provide a new and improved telescopic, length extensible device, having a plurality of telescoping hollow elements, including an innermost one and an outermost one, and at least one in-between one, further including a drive connected for obtaining telescopic extension (deployment) and retraction (collapse); the improvement is specifically directed to a structure for ensuring a predetermined sequence in the extension and retraction of the arrangement of the telescopic elements.

In accordance with the preferred embodiment of the present invention a latching structure is suggested to operate between adjacent telescopic elements. This latching structure includes a guided, movable latch element, such as a first pin which can latchingly engage an opening in a more inner (third one) of the telescoping elements. In addition, the latching structure is provided with a flat counter latch element that is connected to a second one of the telescoping elements and cooperates with the first pin. Additionally, a second pin is provided having a nose which is inserted in a notch or indent of the latch element, and a control lever is provided which is inserted selectively in two indents of the second pin in order to block that second pin and prevents its removal. This kind of arrangement is repeated from tube triplet to triplet in overlapping relationship, except that the two outermost tubes do not need a special latching among themselves.

The latch element may be a pin (first pin) with the other pin being a second pin, as stated. The second pin, thus, has a nose which can engage differently deep recesses in the first pin. The third telescopic element has two abutments on stops, one of them cooperating with a guide element on the one telescopic element that carries the (first) pin. The other abutment operates the control lever, which is spring biased and pivot mounted on the mounting structure for the first pin. The central part of the first pin has an opening with oblique surfaces, cooperating with the counter latch on the above-mentioned other telescopic element. The differently deep recesses have oblique surfaces, cooperating with oblique surfaces of the nose, the obliqueness being close to a minimum of self-locking. The second pin is preferably spring-biased towards the first pin.

Such a device permits indeed the maintaining of the definite sequence of element operation with positive locking of those elements in relation to each other which are to remain immobilized during any particular operational step so as to be unlatching at will and on demand, and not as a happenstance. Moreover, the inventive structure operates simply and automatically in dependence on the relative motion of juxtaposed elements. The inventive structure is applicable for manual operation as well as for motor driven deployment and retraction.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 2A is a cross-section through a modified latch structure, showing a fully retracted, telescopic arrangement;

FIG. 2B is a section as indicated by line BB in FIG. 2A;

Figure 1:
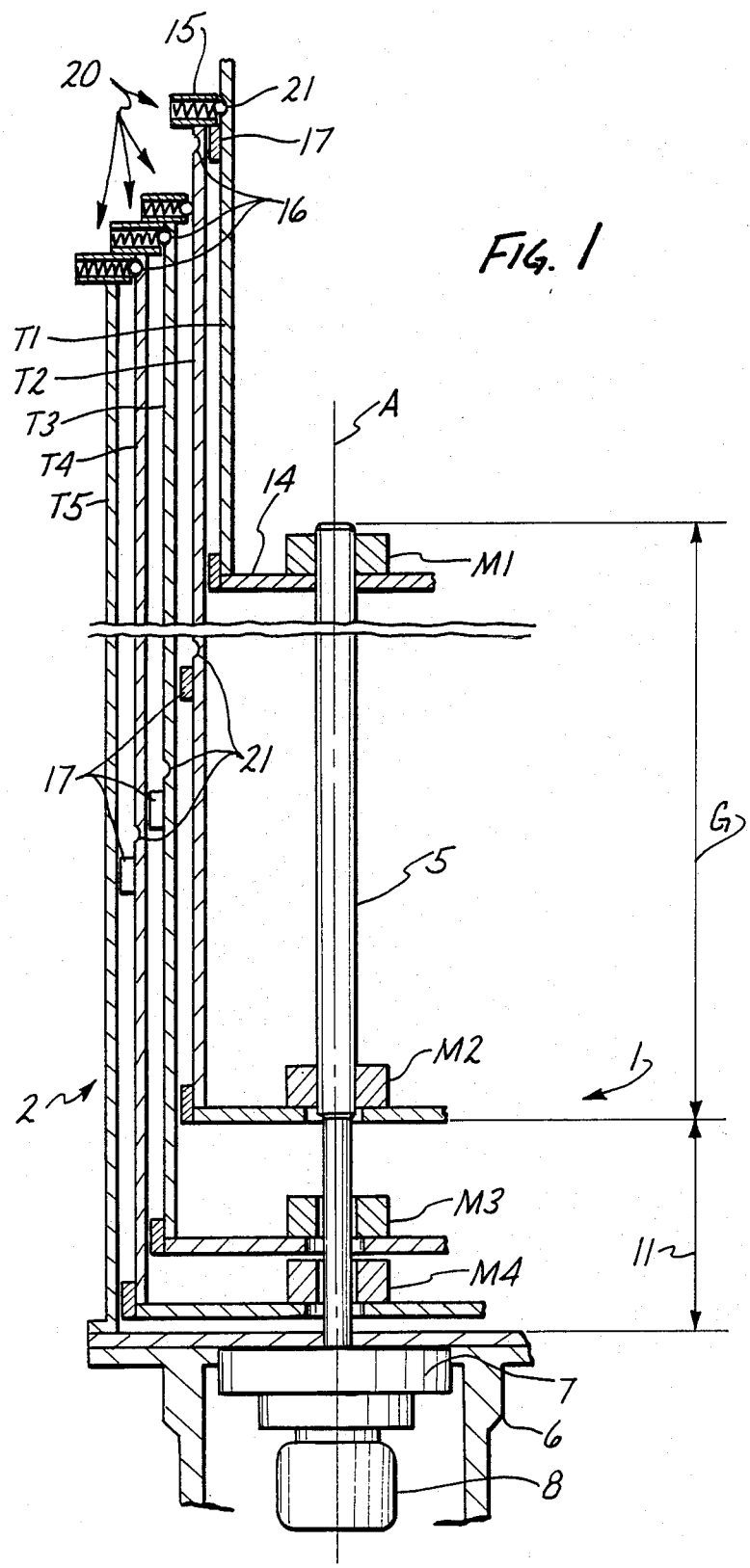
FIG. 1 is a somewhat schematic cross sectional view through a plurality of telescoping elements including structure constructed in accordance with the preferred embodiment of the present invention for practicing the best mode thereof.

Proceeding now to be detailed description of the drawings, the figures illustrate a particular example, basically establishing a length extendible tower or mast 2. This tower or mast is composed of individual telescopic elements such as the tube T1, T2, T3, T4, and T5. Herein the tubular element T1 is the innermost and T5 is the outermost one of these telescopic elements. One can also say that the elements establish the following pairs: T1, T2; T2, T3; T3, T4; T4, T5. Or one can say that the establish these triplets: T1, T2, T3; T2, T3, T4; T3, T4, T5. Respective juxtaposed ones of these elements are prevented from rotating in relation to each other. There are suitable cam structures provided which are not shown and are conventional.

Reference numeral 1 generally refers to an advance or drive structure which in this particular example and embodiment is comprised of and includes a drive spindle 5 being concentrically arranged inside the innermost element T1. This spindle drive is mounted for rotation in a suitable stationary support structure 6. The mounted end of the spindle is connected to a drive motor 8, there being a reducing gear 7 interposed. The gear is appropriately connected to the shaft of the motor 8, and to the spindle 5. The motor is reversible electric motor and is provided for control; deployment and retraction purposes.

The spindle 5 has a usual threaded section or portion G which covers the bulk of that spindle, but there is a certain section or portion 11 being closer to the mounting end of the spindle 5. That portion 11 is characterized by a smaller diameter particularly the diameter is even smaller than the core diameter of the threaded portion 6. This particular section 11 is provided to receive nut elements M2, M3, and so forth, in a stacked, unthreaded relation. In such a free association these nuts are freely rotatable on that section 11 without engaging any thread and without moving the spindle. The spindle remains rotatable, without advancing the nuts when they are (or on) in that section 11.

The nuts M1, etc., are fastened in each instance to annular elements such as 14 being annular bottoms of the respective tubes T1-T4. Whenever the mast is in fully retracted position then, in fact, all nuts but one are disengaged from the threaded part of the spindle and the disengaged ones are all seated on and around the cylindrical section 11. However, one nut, namely M1, must remain in engagement with the lowest portion of the thread, when all others are disengaged, otherwise one would not be able to put the device into operation. The situation is analogous in the case of maximum protraction of the mast. Here all nuts, except M4, are fully disengaged from the spindle (and above) and do not sit anymore thereon at any place, but the nut M4 does not disengage the threaded part G completely. The structure is thus, operated in accordance with the following principle. There is always at least one of the nuts in engagement with the thread G of the spindle 5. Moreover, before a nut disengages from the threading, either at the upper end or from the lower end of the threaded part, this will happen only when the respective next one is already in engagement, and it is not the lead one. Further, in FIG. 1 one can see a mode of operation such that M1 can be unthreaded from 5-G since M2 is threaded onto 5-G.

In accordance with the invention it is required that the sequence of deployment and retraction of the telescoping elements T1 to T5, as well as the locking and securing the locks in relation to each other follow a particular sequence. For this, latch structure 20 is provided to be explained next.

The latch structure includes four units. Spring loaded latch elements 15 are provided which engage recesses 16 and 21 in the elements T1-T5. The spring bias of the latches 20 beginning with the element T2 increases such that T5 is under maximum spring bias, the axial force acting on T1 at a given time will inevitably release first the latching between T1 and T2. This release causes T1 to be set into motion. Any further force is absorbed by the moving element T1. Inevitably, therefore, the other elements T2-T5 remain at rest.

T1 moves until its outer guide ring 17 abuts the casing or housing of the device 20 of element T2, thereby attempting to carry the element along. The force at that point is a force tending to open the latch between elements T2 and T3. Since the forces of latching between T3 and 4, and between T4 and T5 are stronger, any latch opening is inevitably limited at that point to occur as between T2 and T3. Simultaneously, the spring loaded elements 15 of T2 engages indent 21 of element T1 so that T1 is latched in that fashion to element T2.

As the acting force continues T1 and T2 are moving together particularly after the latch between T2 and T3 has been released. It should be noted that the latching connection between the elements T1 and T2 holds even after the nut M1 has been unthreaded from the telescopic element T1.

It can readily be seen that the other deployment operation follow in like manner. It can also be seen that upon changing the direction of spring force increase, e.g. to decrease T1 to T5; the sequence of deployment is reversed.

Having described this basic operation of one particular embodiment we proceed now to the operation of other structures with possibly different kind of sequences. However, in these various embodiments there is always a sequence in which, from the fully retracted position, the innermost element is moved out first, and the others follow in a sequence that runs from the more inner telescoping elements to the more outer ones.

FIGS. 2A and 2B show the specific latching structure 20 in retracted position. The specific latch structure is mounted between tubes T2 and T3, and cooperate for latching (and release from) tube T1. The telescoping element T1 bears against a stop 22 under utilization of glide (rolling) devices 24. There is shown another such stop 22 with guides (rollers) 24 acting between T2 and T3. The stops 22 are secured to the respective telescopic elements.

A sword-like actuating counter element 26, made of metal, is fastened to the outermost telescopic element illustrated, namely T3. The element is constructed to have towards its upper end two inclined, run-off or run-on surfaces 28 and 30. Element 26 penetrates centrally into a pin 32 being provided with an opening 34. The opening 34 is likewise provided with two oblique surfaces 38 and 36. Two smaller diameter, cylindrical guide sections 40 and 42 of the pin 32 are supported in guides 44 and 46 respectively without any play. The guide portions 44 and 46 are bushings which are mounted to the support structure T2-T20 in representation of the feature which is involved in a mounting structure that is affixed to and moves with tube T2. There is an analogous structure T3-20. For receiving the guide 44 telescoping mounting structure element T2-20 is provided with a bore 45 for receiving the guide 44.

The central part 48 of the pin 32 is provided on its outside, and laterally with two notches 52 and 50. Upon being retracted, i.e. upon pin 32 has been retracted, another pin 54 abuts pin 32, but at a right angle, specifically the right angle is taken in relation to the pin 32 and the abutment obtains by a nose 36 of pin 54 against a notch 50. Specifically, the nose surface 58 of nose 56 aereally engages the notching surfaces 60 of the notch 50. The pin 54 is maintained in this position owing to spring loading by means of a spring 62.

In addition, a control lever 64 acts on the pin 54. This control lever 64 engages recess 66 in pin 54 to prevent movement in longitudinal direction. The control lever 64 can be pivoted about a bearing axis 68 and carries at the longer end 70 a particular receiving recess 72. A spring element 74 engages that recess 72. The spring element bears against a casing of the device 20 which is not shown otherwise in this drawing.

The shorter end 76 of control lever 64 penetrates radially beyond the telescoping element T2 and into the extension and action range of the element T1. For this, T2 is provided an oblong bore 78 in the wall of the telescoping element T2. The end 76 of the lever 64 penetrates through an opening on the telescoping element T2 to locate across the extension of the element T1. For this then, there is provided an oblong slot 78 in the wall of the telescopic element T2. This particular end 76 of the control lever 64 is, or can be used, for accurately adjusting the release, and for this, an adjustment and trimming screw may be provided, which is not shown.

Pin 54, as stated, has an indent 66, but there is another indent 80 which, however, is only half as deep as the indent 66. Both indents, 66 and 80, of the pin 54 engage contact surface 86 of the control lever 64, and in the different sections thereof, as far as the locking operation is concerned. The telescopic element T1, moreover, is provided with two strips 82 and 84, which have such a distance from each other that simultaneously stop 82 of telescopic element T1 engages stop 22 of telescopic element T2 while, at the same time, the stop 84 of element T1 engages the end 76 of the control lever 64.

Figure 3A:
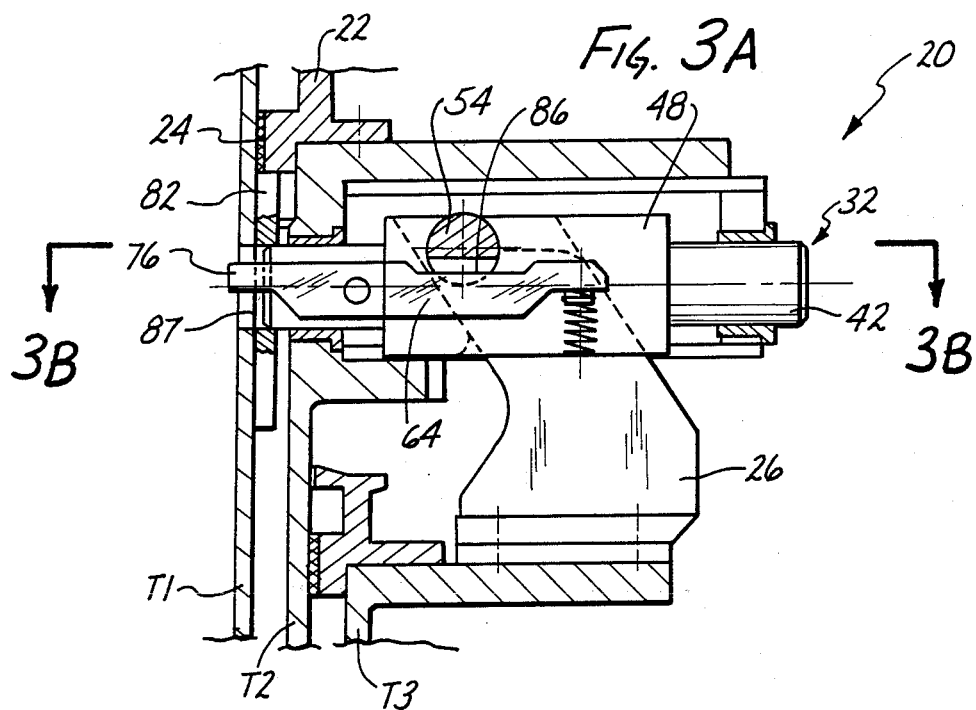
FIG. 3A is a section similar to FIG. 2A, but shows the latch structure unlatched as far as tubes T1nd T2 are concerned.
Figure 3B:
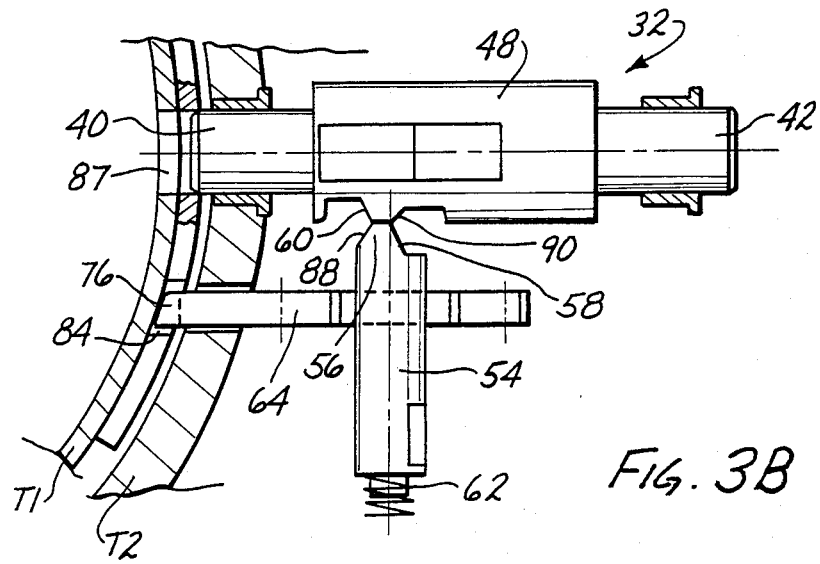
FIG. 3B is a section as indicated by line B in FIG. 3A.

The various figures show the operation of the latching device 20. FIGS. 2A, 2B show, as stated, the fully retracted position. Now, the deployment and protraction will be described with respect to transitions to FIGS. 3A, 3B, and later to FIGS. 4A, 4B. The sequence is such that prior to unthreading M1 from spindle 5-G, the stop 82 of telescopic element T1 reaches the stop 22 of the telescopic element T2, and the two stops engage. Still simultaneously, stop 84 of telescopic element T1 reaches the end 76 of the control lever 64, as stated, and now urges this particular lever 64 against the force of spring element 74, and in the direction of protraction, as far as the telescopic arrangement is concerned (FIGS. 3A, 3B).

Up to this point in time, and by operation of control lever 64, that lever engages the deeper depth 66 under utilization of the contact surface 86 of the control lever 64. Instrumental here is the spring element 74 and its slight inclination in relation to the bearing and mounting axes 68. Here then nose 56 of pin 54 with its engages the notch 50 of the pin 32, so that the surface 58 of the nose 56 abuts surface 60 of notch 50; there is, thus, mutual engagement. This way now, pin 32 is prevented from shifting vertically to the longitudinally axes of the telescopic tubes. This is so, because the run on surfaces 36 and 38 of pin 32, as well as the surfaces 28 and 30 of the metal "sword" element 26 remain positively in engagement with each other.

A release of the telescopic element T2 and T3 is, therefore, possible only when the pin 32 has a possibility of adjustment vertically to the longitudinal axes of the telescopic arrangement. Therefore, there is a firm and positive connection between the telescopic elements T2 and T3, up until a time of opening of the lever 64. That is one of the factors which guarantee the correct sequence of deployment. This is specifically so, because all elements that are supposed to follow, can follow only after opening of the control lever 64. This, in turn, is possible in this particular embodiment only after complete deployment of the preceding element T1.

At some point in time, the abutment 82 of the telescopic element T1 reaches stop 22 of T2, and the abutment 84 of element T1 reaches the end of 76 of the control lever 64. (Transition from FIGS. 3A, 3B to FIGS. 4A, 4B). Now the control lever 64 is moved against the spring element 74 in relation to the axes 68 and in longitudinal direction, to become situated in the horizontal position. This way one causes pin 54 to unlatch; pin 32 is likewise unlatched. Owing to the following of the telescopic element T2 by operation of the abutments 82 and 22 in direction of extension-deployment (up in the FIGS.) the surfaces 28 and 30 of the element 26 provide a force against the pin 32 through its surfaces 26 and 38. That force acts transversely to the axes of the telescopic elements and arrangement. This way, it causes the cylindrical part 40 of pin 32 to reach through the guide 44 of the telescopic element T2-20, and into the gap or inlet 82 of element T1. Now, elements T1 and T2 are positively interconnected and locked to each other. The indent 87 is preferably strengthened through a worked-in sleeve.

On advance of pin 32, pin 54 is forced through its nose 58 away from the surface 60 of notch 50 against the spring element 62. Now, the contact area 86 of lever 64 engages the shallower indent 80, i.e. this indent 80 is, as stated, not as deep as the indent 66, and that makes sure that the control lever 64 is maintained in its horizontal position and will not latch again.

Figure 4A:
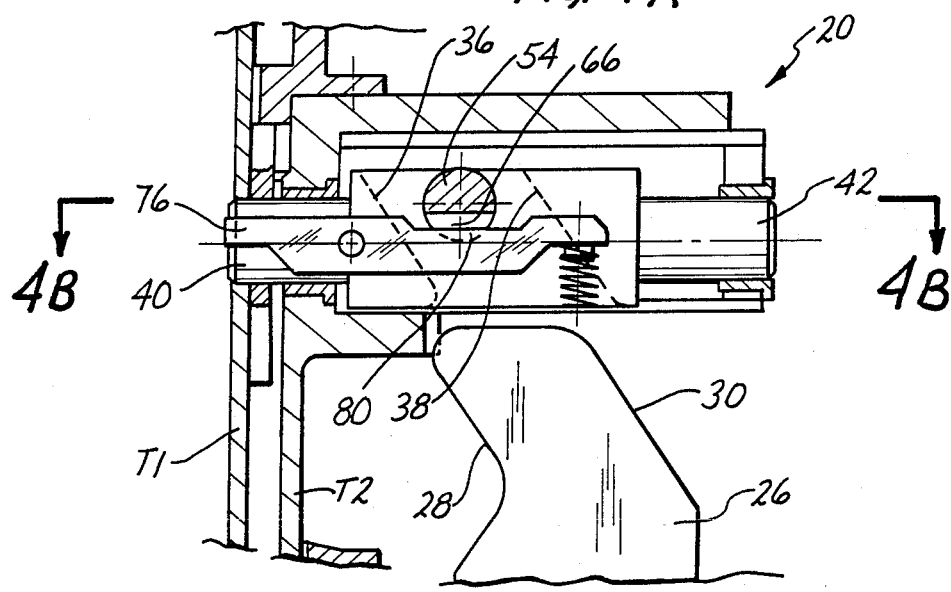
FIG. 4A is a similar section, but showing the latch structure with relatching of tubes T1 and T2 in the deployed position.
Figure 4B:
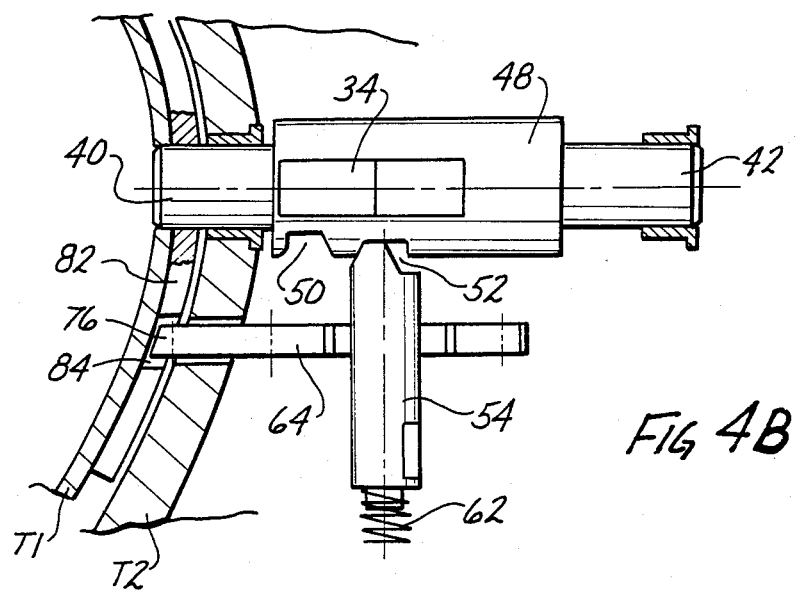
FIG. 4B is a section as indicated by line B in FIG. 4A.

As shown in FIGS. 4A and 4B following the completed latching the cylindrical part 40 of the pin 32, is positively connected as between the telescopic element T1 and T2. This way, it is possible that the nut M2 of the element T2 can be threaded onto the spindle 5 (part a) and the nut M1 now can leave the spindle, particularly the threaded area.

Another surface 88 of nose 56 will now, in this deployed position, be in engagement with the notch surface 90 of the notch 52 of pin 32. The nose surfaces 58 and 88, as well as the notch surfaces 60 and 90, may preferably have an angle of inclination in relation to the longitudinal axes of the pin 54, which angle is between 20 and 24 degrees. Preferably, one will use an angle of about 22 degrees, because self locking of the engaging parts is relatively weak for this angle, in fact, it has a minimum at that point.

The retraction of the deployed telescope is carried out analogously. First, the unthreaded nut M1 will be threaded onto the spindle part 5G. Next, element 26 slides across surfaces 28 and 30 of the pin 32, and surfaces 36 and 38 extend beyond the gap or notch 87. Simultaneously, pin 54 is forced over and above the nose surface 88 of nose 56, and over the notch surface 90 of notch 52 against the spring element 62. The pin 32 is now guided and retracted further, and unlatches the telescopic elements T1 and T2.

Next, nose 56 of pin 54 is able to reach the notch 50 so that the nose surface 58 and the notch surface 60 again abut. Control lever 64 is forced into the notch 66 by operation of the spring 74. Accordingly, the control lever 64 now assumes inclined position. Following the completion of retraction, it will be necessary to re-latch elements T2 and T3. This obtains in that upon further down movement of telescopic element T1, nut M2 of telescopic element T2 leaves the threaded portion of the spindle 5 at the lower end and enters the thread-free space 11. This end position permits relatching of elements T2 and T3.

The other elements follow in exactly the same sequence and cooperate in the same fashion, and these operations are merely repetitions of what has been described. On the other hand, one can readily see that the number of telescopic elements can be increased, there being probably certain practical limitations, depending on the field of employment.

The invention is not limited to the embodiments described above but all changes and modifications thereof, not constituting departures from the spirit and scope of the invention, are intended to be included.

I claim:

1. In a telescopic, length extensible device, having a plurality of telescoping hollow elements, including an innermost one, at least one further, and an outermost one, further including drive means connected for obtaining telescopic extension and retraction, a device for ensuring a predetermined sequence in the extension and retraction of the elements, comprising:
    a first pin; means for mounting the first pin for radial displacement, on one of any two mutually adjacent ones of the elements, the first pin having a central opening;
    the first pin provided for selective insertion into and retraction from a third one of the elements;
    a counter latch element for latching insertion and connected to another one of the two elements, such that when latching obtains, the first pin is retracted from the third element;
    a second pin having a nose for lateral engagement with notches in the first pin; and
    a control lever, operating in response to positions of the third element, for locking and unlocking the second pin so that the second pin releases or locks the first pin in a protracted position of insertion in the third element or for maintaining retraction therefrom.

2. In a device for ensuring as in claim 1, the first pin having said central opening provided with surfaces cooperating with surfaces of the counter latch element, being inserted therein or retracted therefrom when the third element is locked to the other element by the first pin.

3. In a device for ensuring as in claim 2, the central opening being in a portion of large diameter of the first pin, smaller diameter end portions of the first pin being provided for guiding and sliding, one of these end portions providing said latching to the third element.

4. In a device as in claim 1, the second pin being axially spring biased towards the first pin.

5. In a device as in claim 1, the control lever being pivoted on the mounting means.

6. On a device as in claim 5, the lever being spring biased to be held in indents in the second pin.

7. In a telescopic device as in claim 1, including glide means, respectively interposed between two adjacent ones of the hollow elements.

8. In a telescopic device as in claim 3, one of the end portions sliding in a reinforcing sleeve.

9. In a telescopic, length extensible device, having a plurality of telescoping hollow elements, including an innermost one, at least one further, and an outermost one, further including drive means connected for obtaining telescopic extension and retraction, a device for ensuring a predetermined sequence in the extension and retraction of the elements, comprising:
    a first pin;
    means for mounting the first pin for radial displacement, on one end of a first one of the elements, the pin having slot means with two adjusting surfaces, the surfaces being oblique, the pin also having guide ends;
    a flat counter latch element for latching insertion into the slot means, the latch element having matching operating surfaces for engaging the oblique surfaces, the flat element being connected to a second one of the elements adjacent to the first one such that when latching obtains, the first pin is retracted from a third element; the first pin provided for selective insertion into and retraction from the third one of the elements;

a second pin having a nose for lateral engagement with notches in the first pin; and a control lever, operating in response to positions of the third element, for locking and unlocking the second pin so that the second pin releases or locks the first pin in a protracted position of insertion in the third element or for maintaining retraction therefrom.

10. A device as in claim 9, the first pin having two differently deep notches or recesses each with bevelled edges.

11. A device as in claim 9, the bevels being selected to offer a minimal self locking.

12. A device as in claim 9, the control lever being pivoted on the means for mounting.

13. A device as in claim 9, the third element having a stop for engaging a stop on the means for mounting, the third element having a further abutment for actuation of the control lever.

* * * * *